United States Patent
Bian et al.

(10) Patent No.: US 8,913,823 B2
(45) Date of Patent: Dec. 16, 2014

(54) IMAGE PROCESSING METHOD FOR REMOVING MOVING OBJECT AND ELECTRONIC DEVICE

(71) Applicant: ArcSoft (Hangzhou) Multimedia Technology Co., Ltd., Hangzhou (CN)

(72) Inventors: Qiao-Ling Bian, Hangzhou (CN); Yan-Qing Lu, Hangzhou (CN); Jin Wang, Hangzhou (CN)

(73) Assignee: East West Bank, Santa Clara, CA (US)

( * ) Notice: Subject to any disclaimer, the term of this patent is extended or adjusted under 35 U.S.C. 154(b) by 34 days.

(21) Appl. No.: 13/645,167

(22) Filed: Oct. 4, 2012

(65) Prior Publication Data

US 2014/0099021 A1 Apr. 10, 2014

(51) Int. Cl.
*G06K 9/34* (2006.01)

(52) U.S. Cl.
USPC .......................... 382/164; 382/190; 382/209

(58) Field of Classification Search
USPC ......... 382/164, 158, 190, 209, 155, 175, 156, 382/157; 355/46; 352/87; 353/98; 348/701, 348/14.15, 207.99, 699; 375/240.16
See application file for complete search history.

(56) References Cited

U.S. PATENT DOCUMENTS

| | | | | |
|---|---|---|---|---|
| 5,606,376 | A * | 2/1997 | Shinohara | 348/701 |
| 8,118,434 | B2 * | 2/2012 | Turner et al. | 353/46 |
| 8,229,209 | B2 * | 7/2012 | Paquier | 382/155 |
| 8,290,250 | B2 * | 10/2012 | Paquier | 382/155 |

FOREIGN PATENT DOCUMENTS

EP 2360644 A2 8/2011

* cited by examiner

*Primary Examiner* — Anh Do
(74) *Attorney, Agent, or Firm* — Muncy, Geissler, Olds & Lowe, P.C.

(57) ABSTRACT

An image processing method for removing a moving object includes an input step of inputting input images; a matching step of matching the input images according to corresponding positions; a determining step of determining a background image from the input images; a marking step of marking at least one moving object from at least one of the input images; and a replacing step of replacing a region, occupied by the moving object in at least one of the input images with a corresponding regional background in another input image.

15 Claims, 8 Drawing Sheets

IMAGE PROCESSING METHOD FOR REMOVING MOVING OBJECT AND ELECTRONIC DEVICE

BACKGROUND OF THE INVENTION

1. Field of Invention

The invention relates to an image processing method and an electronic device.

2. Related Art

With the progress of the technology, electronic devices (e.g., a digital camera, a camera mobile phone or any other tablet computer, notebook computer or the like with a camera lens or camera lenses) with camera functions are easily available. The user can easily record life details or scenic spots with photos obtained using the electronic device with the camera function.

However, there may be accident conditions occurring during photographing. For example, a vehicle is driven into the composition of the user, or a flock of wild birds fly through the lens. Such moving objects may accidentally appear on the photo, thereby deteriorating the aesthetic feeling of the photo. Therefore, if the moving object destroying the aesthetic feeling can be removed from the photo, the user may obtain a better user experience.

SUMMARY OF THE INVENTION

In view of the foregoing, an objective of the invention is to provide an image processing method and an electronic device for removing a moving object.

To achieve the above objective, the present invention discloses an image processing method, comprising an input step of inputting multiple input images; a matching step of matching the input images according to corresponding positions; a determining step of determining a background image from the input images; a marking step of marking at least one moving object from at least one of the input images; and a replacing step of replacing a region, occupied by the moving object in at least one of the input images, with a corresponding regional background in another one of the input images.

In one embodiment, the input images are sequentially shot images.

In one embodiment, the matching step comprises: searching at least one characteristic corner in a first input image of the input images; calculating an error amount between the characteristic corner and each of corresponding candidate points in a second input image of the input images when the characteristic corner is found; finding a minimum error from the error amounts; setting the characteristic corner, corresponding to the minimum error, and the corresponding candidate point as matching corners; calculating corner offsets according to coordinate values of the matching corners in the first input image and the second input image; and calculating an overall offset according to the corner offsets.

In one embodiment, the determining step comprises: finely tuning coordinates of the input images according to the overall offsets, respectively; obtaining a pixel color of a common corresponding coordinate of the input images; and finding the pixel color with the highest appearance possibility in each of the common corresponding coordinates as the pixel color of each of the coordinates of the background image.

In one embodiment, the marking step comprises: comparing the pixel colors of each of the coordinates of each of the input images after fine tuning with the pixel colors of each of the coordinates of the background image one-by-one, and thus calculating a difference value; and marking the moving object according to each of the difference values.

In one embodiment, the marking step comprises: prompting a candidate object to be marked by a user; and marking the candidate object as the moving object according to a user instruction.

In one embodiment, the replacing step comprises: finding the regional background, corresponding to the moving object, from the another one of the input images; and replacing the moving object with the regional background.

To achieve the above objective, the present invention also discloses an electronic device, which comprises a storage unit and a processing unit. The storage unit stores input images. The processing unit matches the input images according to corresponding positions, determines a background image from the input images, marks at least one moving object from at least one of the input images, and replaces a region, occupied by the moving object in at least one of the input images, with a corresponding regional background in another one of the input images.

In one embodiment, the electronic device is a digital camera or a camera mobile phone.

In one embodiment, the input images are sequentially shot images.

In one embodiment, the processing unit matches the input images according to the corresponding positions by the following steps of: searching at least one characteristic corner in a first input image of the input images; calculating an error amount between the characteristic corner and each of corresponding candidate points in a second input image of the input images when the characteristic corner is found; finding a minimum error from the error amounts; setting the characteristic corner, corresponding to the minimum error, and the corresponding candidate point as matching corners; calculating corner offsets according to coordinate values of the matching corners in the first input image and the second input image; and calculating an overall offset according to the corner offsets.

In one embodiment, the processing unit determines the background image from the input images by the following steps of finely tuning coordinates of the input images according to the overall offsets, respectively; obtaining a pixel color of a common corresponding coordinate of the input images; and finding the pixel color with the highest appearance possibility in each of the common corresponding coordinates as the pixel color of each of the coordinates of the background image.

In one embodiment, the processing unit marks the at least one moving object from the at least one of the input images by the following steps of: comparing the pixel colors of each of the coordinates of each of the input images after fine tuning with the pixel colors of each of the coordinates of the background image one-by-one, and thus calculating a difference value; and marking the moving object according to each of the difference values.

In one embodiment, the electronic device further comprises a display unit and an input unit. The display unit prompts a candidate object to be marked by a user. The input unit is configured for inputting a user instruction. The processing unit marks the candidate object as the moving object according to the user instruction.

In one embodiment, the processing unit replaces the region, occupied by the moving object in the at least one of the input images, with the corresponding regional background in the another one of the input images by the following steps of: finding the regional background, corresponding to the moving object, from the another one of the input images; and replacing the moving object with the regional background.

As mentioned above, according to the image processing method and the electronic device of the invention for removing the moving object, the user can remove the moving object, which destroys the aesthetic feeling, from the photo according to the invention so as to obtain the better user experience. In addition, the invention may be applied to various electronic devices, such as a personal computer, a digital camera, a camera function mobile phone and the like, and the operations thereof are simple and convenient, so that the user can save the input image without the moving object or share the input image with friends according to the invention, and the better user experience can be obtained.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
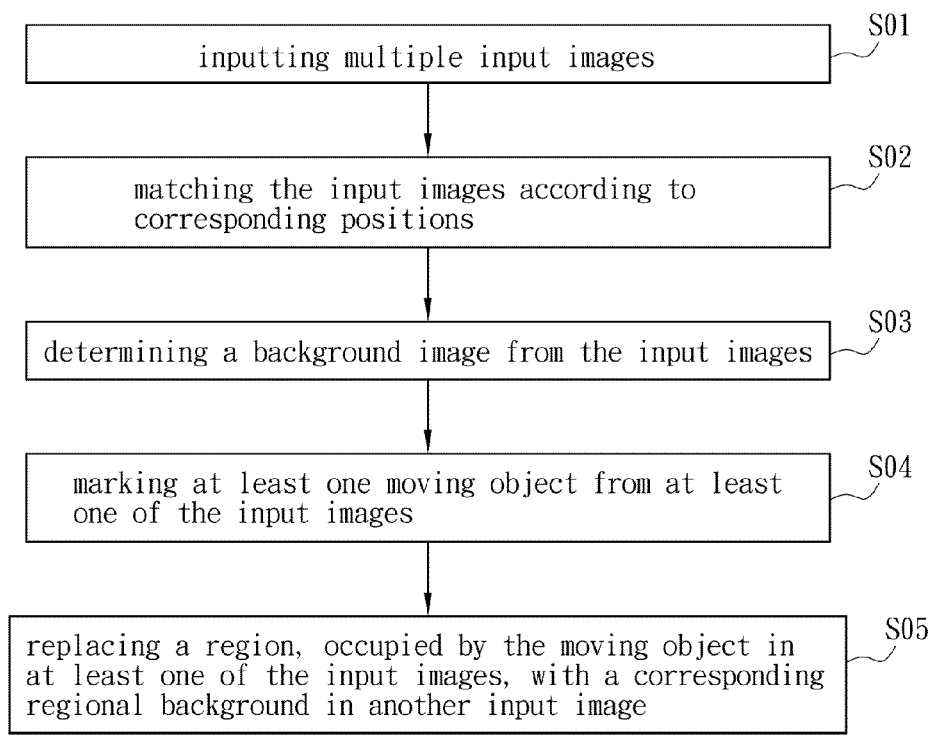
FIG. 1A is a flow chart showing an image processing method according to a preferred embodiment of the invention.

FIG. 1A is a flow chart showing an image processing method according to a preferred embodiment of the invention. The image processing method may be applied to an electronic device, such as a portable electronic device including a digital camera, a camera mobile phone, a mobile phone, a tablet computer, a notebook computer or the like; or a non-portable electronic device including a personal computer, a digital photo frame or the like.

Referring to FIG. 1A, the image processing method includes steps S01 to S05.

The step S01 is an input step of inputting multiple input images. Specifically, the input images may be inputted by directly shot by the photographing lens of the electronic device; or the input images may be stored in a storage unit of the electronic device, and the user provides a call event to call the images from the storage unit. The storage unit may be a built-in element of the electronic device, such as a random memory, an internal hard disk drive, a solid state disk drive, or the like. Of course, the storage unit may also be an element, which is not built in the electronic device, but is coupled to the electronic device in a wired or wireless manner. For example, the storage unit may be an external hard disk drive, a universal serial bus (USB) mobile disk, or each of various memory cards coupled to the electronic device in the wired manner. Alternatively, the storage unit may be a cloud hard disk drive or a wireless universal serial bus (WUSB) mobile disk coupled to the electronic device in the wireless manner. Preferably, the input images are sequentially shot images, such as a set of images shot by a digital camera in a burst mode.

The step S02 is a matching step of matching the input images according to corresponding positions. Taking the input images, which are sequentially shot images, as an example, the acquiring time interval between the input images is extremely short (e.g., several milliseconds). So, the input images have similar background images. In this matching step, a portion or all of the input images are matched according to the corresponding positions to find the corresponding relationships between the input images.

Figure 2:
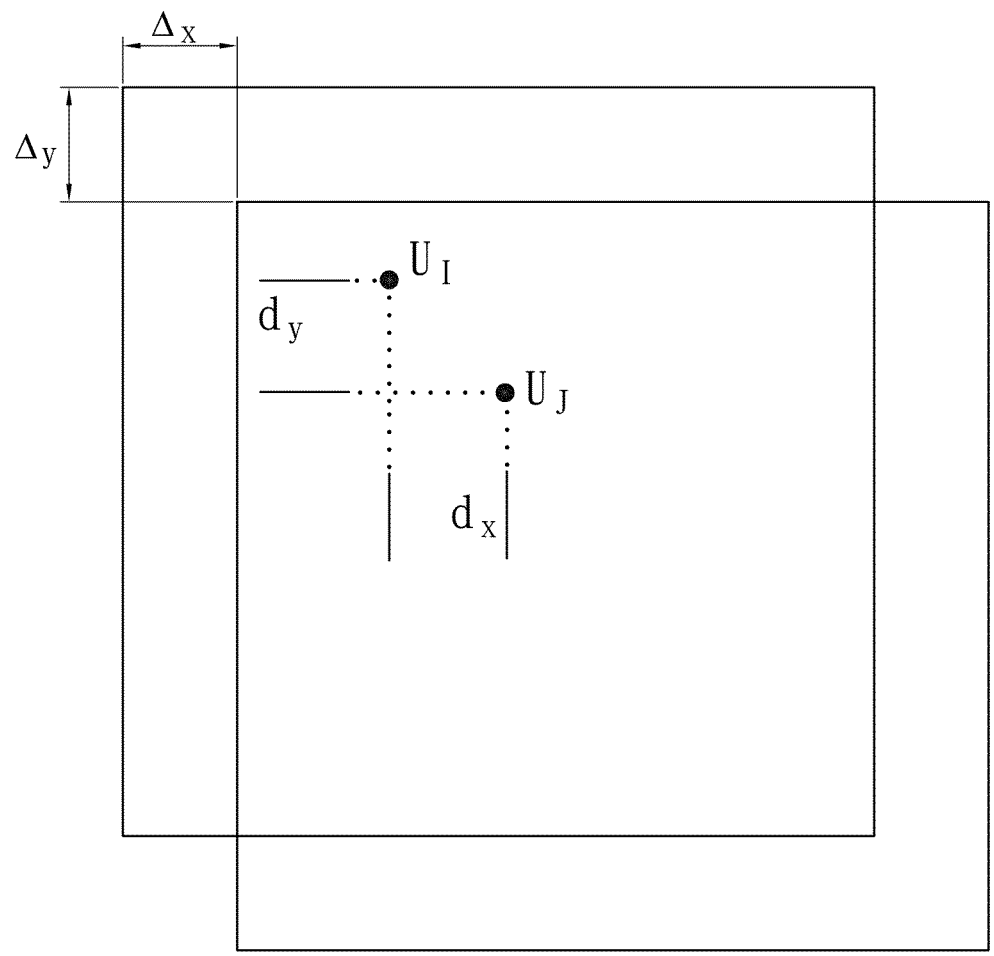
FIG. 2 is a schematic illustration showing matching of input images according to corresponding positions.

Referring simultaneously to FIG. 2, the processes of the matching step will be further described in the following.

Referring simultaneously to FIG. 2, multiple input images of the video are matched according to the corresponding positions, and the processes are described in the following.

First, the Harris corner detection approach is adopted to find at least one characteristic corner in the first input image, wherein the operation principle of the Harris corner detection approach is to judge whether a pixel point is located in a plane, on an edge or at a corner based on the pixel point by checking the degrees of color level changes in all directions (e.g., up, down, left, right, upper right, upper left, lower right, lower left and the like) around the pixel point. Furthermore, the Harris corner detection approach calculates the color level changes of pixel points in one Gaussian window or rectangular window to judge whether there is a corner present in the window. Generally speaking, there are multiple characteristic corners found. After all characteristic corners in the first input image are found, they are checked one by one.

Next, when one of the characteristic corners is checked, an individual error amount between the characteristic corner and each of corresponding candidate points in the second input image is calculated. Referring simultaneously to FIG. 2, one of the characteristic corners will be described as an example. A coordinate point $(x_I, y_I)$ corresponding to the characteristic corner $u_I=(x_I, y_I)$ in the second input image is offset with different offsets to form multiple corresponding candidate points. Next, a match box around the characteristic corner $U_I$ is opened, and match boxes, which have the same size and are disposed around the corresponding candidate points, are also opened. The content differences between the match box around the characteristic corner $u_I$ and the match boxes around the corresponding candidate points are calculated one by one, so that an error amount between the characteristic corner $u_I$ and each of the corresponding candidate points in the second input image is obtained. The characteristic corner or each of the corresponding candidate points may be located inside the match box, on the edge of the match box or at the corner of the match box. Furthermore, the error amount may be defined as follows:

$$E(d_x, d_y) = \sum_{x=x_I-w_x}^{x_I+w_x} \sum_{y=y_I-w_y}^{y_I+w_y} (I(x, y) - J(x + d_x, y + d_y))^2,$$

where, $d_x$ and $d_y$ are x-axis and y-axis offset components, respectively, $w_x$ and $w_y$ are x-axis and y-axis dimensions of the match box, respectively, $I(x, y)$ and $J(x, y)$ represent the content functions of the first input image and the second input image at the coordinate point $(x, y)$, respectively, and the content function may be represented by a color value or a gray scale value.

Then, a minimum error is found from the error amounts. The characteristic corner, corresponding to the minimum error, and the corresponding candidate point are set as matching corners. Specifically, the x-axis offset component and the y-axis offset component corresponding to the minimum error can be found according to the following equation:

$$(d_x, d_y) = \operatorname*{argmin}_{d_x, d_y} E(d_x, d_y)$$

The smaller error amount represents the higher matching degree between the corresponding characteristic corner and the corresponding candidate point. So, the minimum error amount represents the highest matching degree between the corresponding characteristic corner and the corresponding candidate point. In other words, the characteristic corner and the corresponding candidate point can be paired by finding the minimum error from the error amounts, the corresponding candidate point corresponding to the specific characteristic corner can be found and set as the matching corner, and the corresponding candidate point is marked as $u_j = (x_j, y_j)$.

Finally, corner offsets are calculated according to the coordinate values of the matching corners in the first input image and the second input image. An overall offset is calculated according to the corner offsets. Specifically, when the first input image and the second input image are not necessarily completely the same, especially when the first input image is different and offset from the second input image, the two steps are to calculate the corner offsets between the corresponding matching corners (the characteristic corner and the corresponding candidate point). In this embodiment, the corner offsets are the x-axis offset component and the y-axis offset component between the characteristic corner and the corresponding candidate point corresponding to the characteristic corner. In addition, all the characteristic corners $u_j(x, y)$ in the first input image have the corresponding candidate points $u_j(x+d_x, y+d_y)$, serving as the matching corners, in the second input image, and the corresponding x-axis offset component $d_x$ and y-axis offset component $d_y$. Accordingly, the overall offset between the first input image and the second input image is calculated according to the corner offsets. For example, the overall offset may be divided into the x-axis overall offset and the y-axis overall offset. For the x-axis offset, the statistical averages of the x-axis and y-axis offset components can be calculated according to the following equations, respectively:

$$\Delta_x = \frac{1}{N}\sum_{i=1}^{N} d_{xi}, \quad \Delta_y = \frac{1}{N}\sum_{i=1}^{N} d_{yi}$$

Thus, the first input image and the second input image can be matched, where N represents the number of the matching corners.

As a result, the relationship between the second input image and the first input image may approximate $I(x, y) \approx J(x+\Delta_x, y+\Delta_y)$, where $I(x, y)$ and $J(x, y)$ represent the content functions of the first input image and the second input image, respectively, at the coordinate point $(x, y)$. That is, the content of the second input image at the coordinate point $(x+\Delta_x, x+\Delta_y)$ may approximate the content of the coordinate point $(x, y)$ of the first input image. The content function may represent the color value or the gray scale value of the point.

Referring still to FIG. 1A, the step S03 is a determining step. In the determining step, a background image is determined from the input images, the presence or absence and the located position of the moving object in each input image can be judged according to the background image. The background image can be determined according to the codebook algorithm. Furthermore, the determining step goes as follows.

First, the coordinate of each input image is finely tuned according to each overall offset. For example, the coordinate of any input image can approximate the coordinate of an input image, serving as a reference, plus the overall offset.

Then, the number of occurrences of each pixel color on the same corresponding coordinate point of each input image is counted. For example, the same corresponding coordinate point in the $n^{th}$ input image may be marked as $F_n(x, y, R, G, B, t)$, where x and y represent x-axis and y-axis coordinate values of the coordinate point, respectively; R, G and B represent red, green and blue values of the pixel color of the coordinate point, respectively; t represents the number of occurrences of the pixel color on the same corresponding coordinate point of all input images. Illustrations will be made with reference to a practical example. In this example, there are ten input images, and the pixel color of a certain input image at the coordinate point $(3, 4)$ is $(R=100, G=101, B=102)$, and there are seven of the other nine input images having the pixel color of $(R=100, G=101, B=102)$ at the same corresponding coordinate point $(3, 4)$, and the coordinate characteristic is marked as $(3, 4, 100, 101, 102, 8)$.

Next, the pixel color with the highest number of occurrences among the same corresponding coordinate points serves as the pixel color of each coordinate of the background image. For example, by establishing a following statistical matrix:

$$\begin{bmatrix} P(1,1) & P(1,2) & \cdots & P(1,w) \\ P(2,1) & P(2,2) & \cdots & P(2,w) \\ \vdots & \vdots & \ddots & \vdots \\ P(h,1) & P(h,2) & \cdots & P(h,w) \end{bmatrix}$$

where w and h represent the dimensions (the unit is a pixel) of the width and the height of the input image, respectively, the pixel color with the highest number of occurrences is found, one by one, for the coordinate points and serves as the pixel color of the coordinate point of the background image. This is represented by the following equations.

$$i = \operatorname*{argmax}_{i}\{t_i \mid t_i \in F_i\}$$
$$I(x, y) = \{(R_i, G_i, B_i) \mid (R_i, G_i, B_i) \in F_i\}$$

Another practical example will be described in the following. There are ten input images, the number of occurrences of the pixel color $(R=100, G=101, B=102)$ at the coordinate point $(3, 4)$ of each input image is equal to 8, the number of occurrence of the pixel color $(R=70, G=71, B=72)$ is equal to 1, and the number of occurrence of the pixel color $(R=30, G=31, B=32)$ is equal to 1. That is, $F1=(3, 4, 100, 101, 102, 8)$, $F2=(3, 4, 70, 71, 72, 1)$, $F3=(3, 4, 30, 31, 32, 1)$, $P(3, 4)=(F1, F2, F3)$, and the pixel color with the highest appearance possibility is $(R=100, G=101, B=102)$. So, the pixel color of the coordinate point $(3, 4)$ of the background image is set as $(R=100, G=101, B=102)$.

The step S04 is a marking step. In the marking step, at least one moving object is marked from at least one of the input images. The marking step may be classified into an automatically marking step and a manually marking step, wherein the processes of the automatically marking step will be described in the following.

First, a difference value is calculated by comparing the pixel color of each coordinate of each input image after fine tuning with the pixel color of each coordinate of the background image.

Next, the moving object is marked according to each difference value. In a practical example, the coordinate point (3, 4) of an input image has (R=70, G=71, B=72) and the coordinate point (3, 4) of the background image has (R=100, G=101, B=102), and the coordinate point (3, 4) of the input image is marked as one pixel of the moving object. That is, when the difference value is greater than a threshold value, it is marked as the pixel of the moving object; and when the difference value is smaller than a threshold value, it is not marked as the pixel of the moving object. The expression is as follows:

$$\Delta I_{binalization}(x, y) = \begin{cases} 0 & \Delta I(x, y) \le T \\ 1 & \Delta I(x, y) > T \end{cases}$$

where $\Delta I(x, y)$ represents the difference value between the pixel color of the coordinate (x, y) of the input image after fine tuning and the pixel color of each coordinate of the background image; and T represents the threshold value, which may have different values in different embodiments and is not particularly restricted.

In addition, the marking step may also be a manually marking step performed through the user selection, and the processes thereof will be described in the following.

First, a candidate object to be marked by the user is prompted. The method of prompting the candidate object may be provided through the automatically marking step.

Then, the candidate moving object is marked as the moving object according to a user instruction. When the user instruction identifies the candidate moving object as the moving object, the mark providing by the automatically marking step is kept. When the user instruction does not identify the candidate moving object as the moving object, the mark provided by the automatically marking step is cancelled.

Figure 1B:
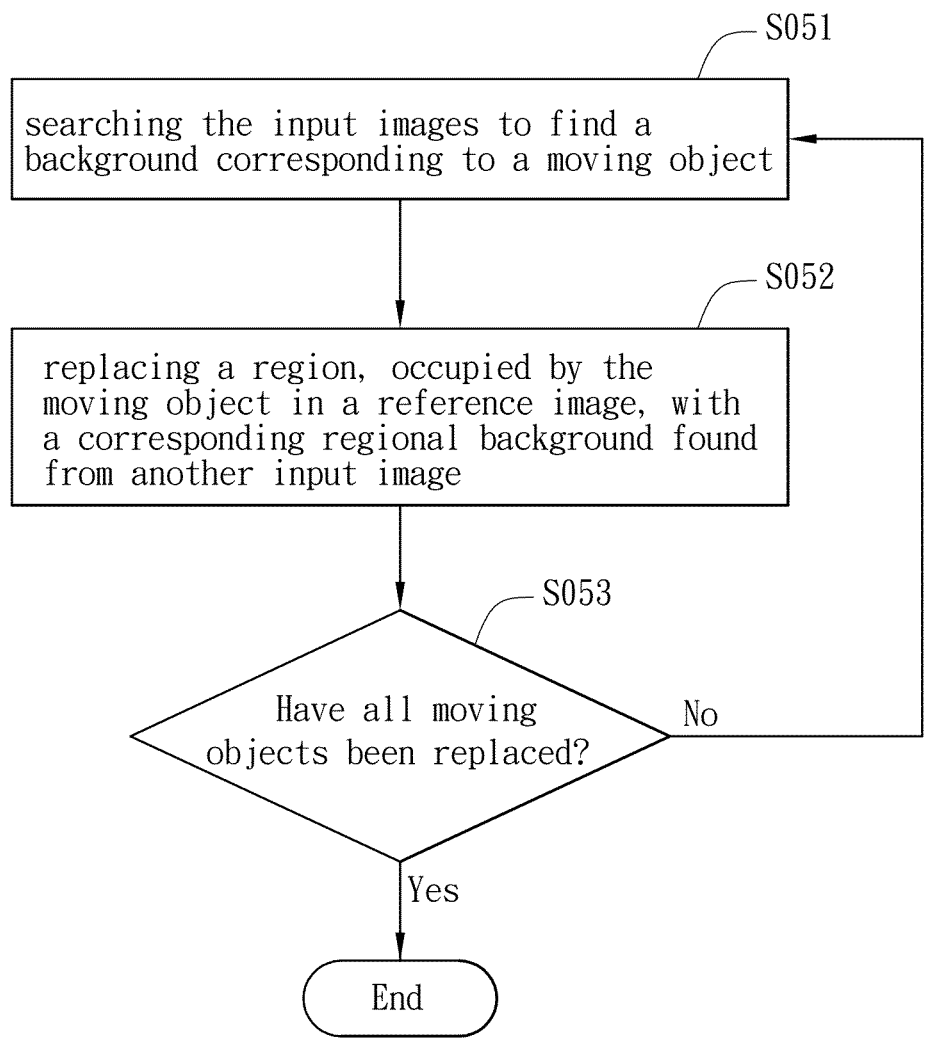
FIG. 1B is a flow chart showing a replacing step.

The step S05 is a replacing step of replacing a region, occupied by the moving object in the at least one of the input images, with a corresponding regional background in another input image. The specific processes of the replacing step are shown in FIG. 1B and will be described in the following.

First, in step S051, the input images are searched to find the background corresponding to the moving object. For example, one of the input images may be firstly selected as a reference image, on which the moving object has been marked. Then, the regional background of the moving object at corresponding positions of other input images is found. Next, in step S052, the region, occupied by the moving object in the reference image, is replaced by the corresponding regional background found from another input image. Next, in step S053, it is judged whether all the moving objects have been replaced. If the judgment result is "No", the process goes back to the step S051 to continue performing the replacing process on other moving objects; otherwise, if the judgment result is "Yes", then the processes are completed.

Figure 3A:
FIGS. 3A and 3B are schematic illustrations showing the image processing method for performing operations.
Figure 3A:
Figure 3A:
Figure 3A:
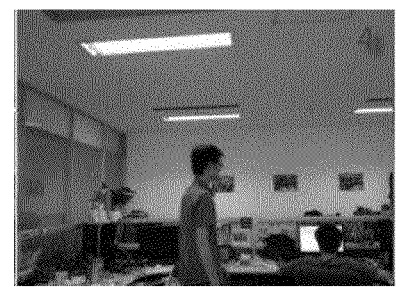
Figure 3A:
Figure 3B:
Figure 3B:
Figure 4A:
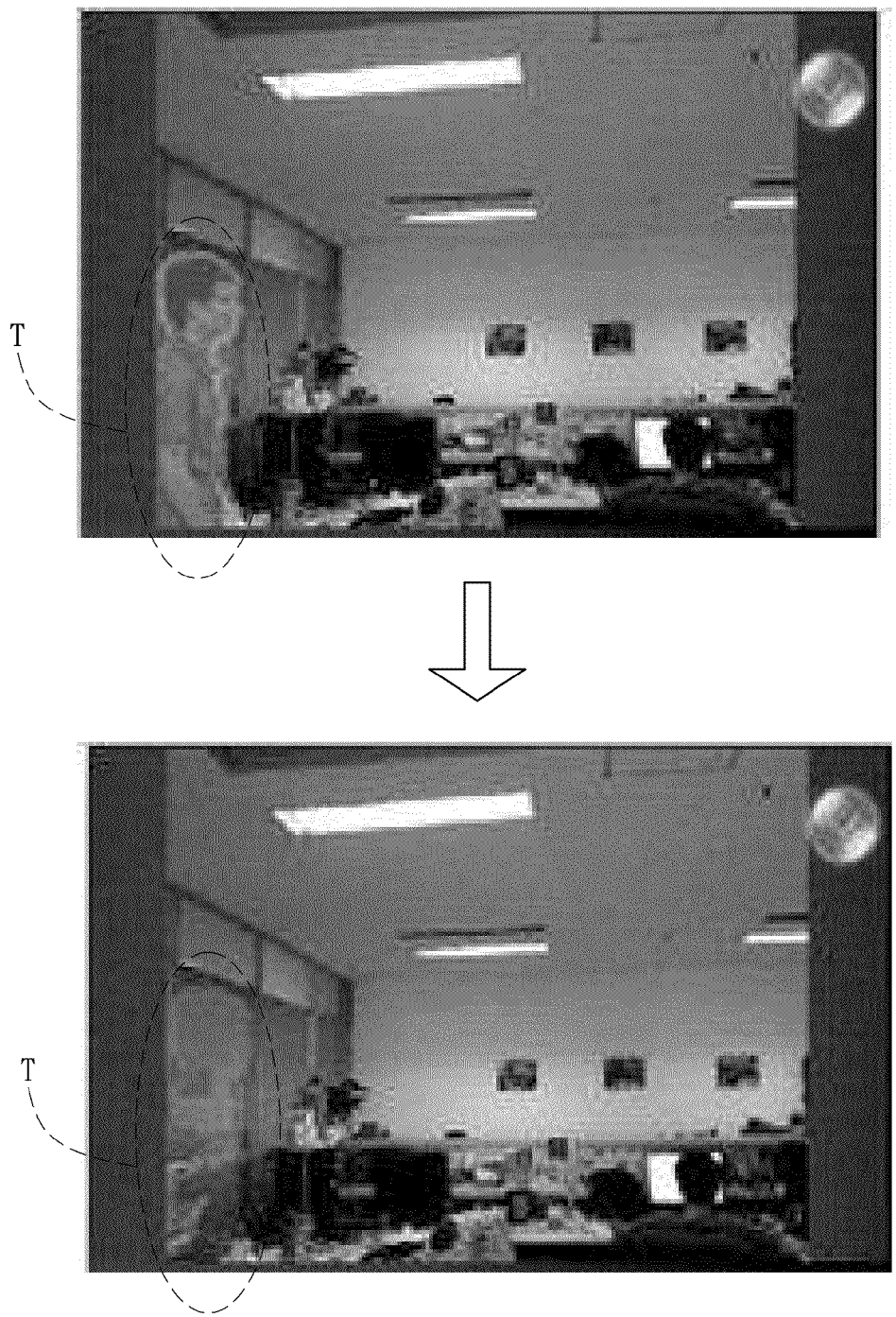
FIGS. 4A and 4B are schematic illustrations showing the image processing method for performing operations.
Figure 4B:
Figure 4B:

Please refer to FIGS. 3A, 3B, 4A and 4B, which are schematic illustrations showing the actual operations. FIGS. 3A and 3B show the method of automatically marking the moving object, while FIGS. 4A and 4B show the method of manually marking the moving object. This actual operation is described by taking a digital camera as an example. However, it is to be specified that the electronic devices, to which the invention can be applied, are not restricted thereto.

As shown in FIG. 3A, the digital camera takes continuous photographing to input five input images. It is to be noted the input images have the same character at different positions.

As shown in the upper and lower pictures of FIG. 3B, the upper picture shows the input image, which has not been processed, while the lower picture shows the input image processed by the image processing method of the invention. Comparing the two pictures, it is obtained that the character has been removed from the processed input image, and the corresponding background of the other input image is obtained for replacement.

As shown in FIG. 4A, this embodiment similarly uses the sequentially shot photographs of FIG. 3A as the input images. In the upper picture, the digital camera prompts a candidate moving object T to the user. When the user clicks this candidate moving object T, the digital camera removes the moving object by performing the image processing method of the invention, and the results are shown in the lower picture of FIG. 4A, in which the character in the region of the candidate moving object T has been removed.

Next, as shown in FIG. 4B, comparing the input image of the upper picture (unprocessed) with the input image of the lower picture (processed), it is obtained that the character in the input image has been removed, and the corresponding background is obtained from the other input image for replacement.

In addition, in some conditions where the image content is shot at a place where many persons come and go, for example, if the input images do not have the moving object, or the presence characteristic of the moving object is not obvious, the marking step does not automatically mark the moving object. At this time, no moving object is marked, so the subsequent replacing step will not be performed.

On the other hand, the marking step may also be configured such that the user can manually mark the moving object so that the subsequent replacing step can be performed in the state where the moving object cannot be automatically marked.

In addition, the marking step may also be configured to prompt multiple candidate moving objects, and the user can select one or more than one object to be removed from these candidate moving objects. After the user has selected, the subsequent replacing step is performed.

Figure 5:
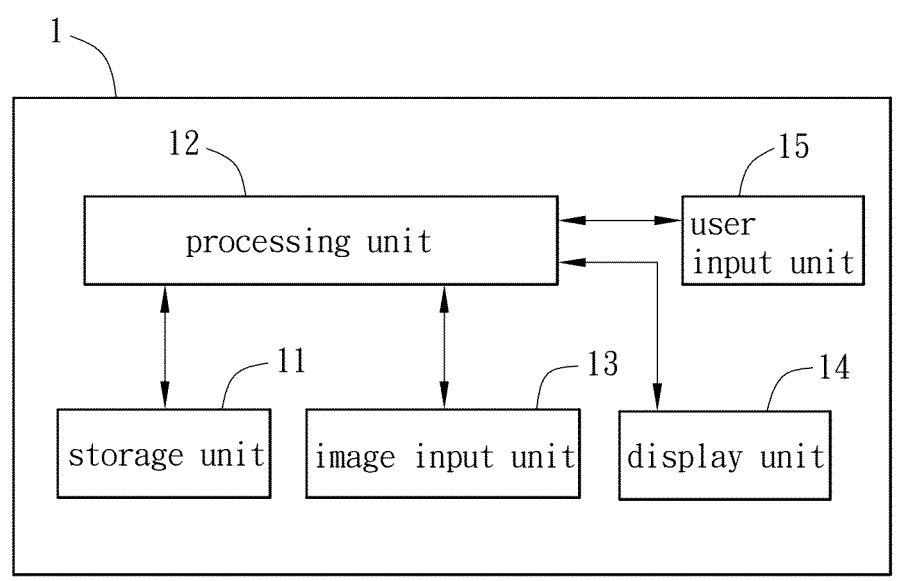
FIG. 5 is a block diagram showing an electronic device according to a preferred embodiment of the invention.

FIG. 5 is a block diagram showing an electronic device 1 according to a preferred embodiment of the invention. Referring to FIG. 5, the electronic device 1 includes a storage unit 11, a processing unit 12 and an image input unit 13. The processing unit 12 is coupled to the storage unit 11 and the image input unit 13.

The storage unit 11 is, for example, a volatile memory, a non-volatile memory, or a combination of the volatile and non-volatile memories. The processing unit 12 is an operation element, such as a processor, a microcontroller or the like, for executing the instruction sets. The image input unit 13 is, for example, a camera module.

The storage unit 11 stores multiple images, which may be inputted from the image input unit 13. The processing unit 12 matches the input images according to corresponding positions, determines a background image from the input images, marks at least one moving object from at least one of the input images, and replaces a region, occupied by a moving object in at least one of the input images, with a corresponding regional background in another input image. Because the associated process flows, details and modifications are similar to the above-mentioned embodiments, detailed descriptions thereof will be omitted.

In addition, the electronic device 1 may further include a display unit 14 and an input unit 15. The input unit 15 is, for example, a touch panel, a keyboard or a mouse. The display unit 14 is, for example, a display or a monitor, such as display panel. The display unit 14 prompts a candidate object to be marked by the user. The user may input a user instruction through the input unit 15. The processing unit 12 can mark the candidate moving object as the moving object according to the user instruction. Because the associated process flows, details and modifications are similar to the above-mentioned embodiments, the detailed descriptions thereof will be omitted.

In summary, according to the image processing method and the electronic device of the invention for removing the moving object, the user can remove the moving object, which destroys the aesthetic feeling, from the photo according to the invention so as to obtain the better user experience. In addition, the invention may be applied to various electronic devices, such as a personal computer, a digital camera, a camera function mobile phone and the like, and the operations thereof are simple and convenient, so that the user can save the input image without the moving object or share the input image with friends according to the invention, and the better user experience can be obtained.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image processing method, which is applied to an electronic device having a storage unit and a processing unit, the image processing method, comprising:
    an input step of inputting multiple input images from the storage unit;
    a matching step of matching the input images according to corresponding positions by the processing unit;
    a determining step of determining a background image from the input images by the processing unit;
    a marking step of marking at least one moving object from at least one of the input images by the processing unit; and
    a replacing step of replacing a region, occupied by the moving object in at least one of the input images, with a corresponding regional background in another one of the input images by the processing unit.

2. The image processing method according to claim 1, wherein the input images are sequentially shot images.

3. The image processing method according to claim 1, wherein the matching step comprises:
    searching at least one characteristic corner in a first input image of the input images;
    calculating an error amount between the characteristic corner and each of corresponding candidate points in a second input image of the input images when the characteristic corner is found;
    finding a minimum error from the error amounts;
    setting the characteristic corner, corresponding to the minimum error, and the corresponding candidate point as matching corners;
    calculating corner offsets according to coordinate values of the matching corners in the first input image and the second input image; and
    calculating an overall offset according to the corner offsets.

4. The image processing method according to claim 3, wherein the determining step comprises:
    finely tuning coordinates of the input images according to the overall offsets, respectively;
    obtaining a pixel color of a common corresponding coordinate of the input images; and
    finding the pixel color with the highest appearance possibility in each of the common corresponding coordinates as the pixel color of each of the coordinates of the background image.

5. The image processing method according to claim 4, wherein the marking step comprises:
    comparing the pixel colors of each of the coordinates of each of the input images after fine tuning with the pixel colors of each of the coordinates of the background image one-by-one, and thus calculating a difference value; and
    marking the moving object according to each of the difference values.

6. The image processing method according to claim 1, wherein the marking step comprises:
    prompting a candidate object to be marked by a user; and
    marking the candidate object as the moving object according to a user instruction.

7. The image processing method according to claim 1, wherein the replacing step comprises:
    finding the regional background, corresponding to the moving object, from the another one of the input images; and
    replacing the moving object with the regional background.

8. An electronic device, comprising:
    a storage unit storing input images; and
    a processing unit, which matches the input images according to corresponding positions, determines a background image from the input images, marks at least one moving object from at least one of the input images, and replaces a region, occupied by the moving object in at least one of the input images, with a corresponding regional background in another one of the input images.

9. The electronic device according to claim 8, wherein the electronic device is a digital camera or a camera mobile phone.

10. The electronic device according to claim 8, wherein the input images are sequentially shot images.

11. The electronic device according to claim 8, wherein the processing unit matches the input images according to the corresponding positions by the following steps of:
    searching at least one characteristic corner in a first input image of the input images;
    calculating an error amount between the characteristic corner and each of corresponding candidate points in a second input image of the input images when the characteristic corner is found;
    finding a minimum error from the error amounts;
    setting the characteristic corner, corresponding to the minimum error, and the corresponding candidate point as matching corners;
    calculating corner offsets according to coordinate values of the matching corners in the first input image and the second input image; and
    calculating an overall offset according to the corner offsets.

12. The electronic device according to claim 8, wherein the processing unit determines the background image from the input images by the following steps of:
  finely tuning coordinates of the input images according to the overall offsets, respectively;
  obtaining a pixel color of a common corresponding coordinate of the input images; and
  finding the pixel color with the highest appearance possibility in each of the common corresponding coordinates as the pixel color of each of the coordinates of the background image.

13. The electronic device according to claim 8, wherein the processing unit marks the at least one moving object from the at least one of the input images by the following steps of:
  comparing the pixel colors of each of the coordinates of each of the input images after fine tuning with the pixel colors of each of the coordinates of the background image one-by-one, and thus calculating a difference value; and
  marking the moving object according to each of the difference values.

14. The electronic device according to claim 8, further comprising:
  a display unit for prompting a candidate object to be marked by a user; and
  an input unit configured for inputting a user instruction;
  wherein the processing unit marks the candidate object as the moving object according to the user instruction.

15. The electronic device according to claim 8, wherein the processing unit replaces the region, occupied by the moving object in the at least one of the input images, with the corresponding regional background in the another one of the input images by the following steps of:
  finding the regional background, corresponding to the moving object, from the another one of the input images; and
  replacing the moving object with the regional background.

* * * * *

UNITED STATES PATENT AND TRADEMARK OFFICE
CERTIFICATE OF CORRECTION

PATENT NO.       : 8,913,823 B2                                   Page 1 of 1
APPLICATION NO.  : 13/645167
DATED            : December 16, 2014
INVENTOR(S)      : Qiao-Ling Bian et al.

It is certified that error appears in the above-identified patent and that said Letters Patent is hereby corrected as shown below:

On the Title page item (73), Assignee, correct "East West Bank, Santa Clara, CA (US)" to
    --ARCSOFT (HANGZHOU) MULTIMEDIA TECHNOLOGY CO., LTD., Hangzhou City (CN)--.

Signed and Sealed this
Twenty-ninth Day of September, 2015

Michelle K. Lee
*Director of the United States Patent and Trademark Office*